United States Patent

[11] 3,620,996

| [72] | Inventors | Shigeru Matsumura<br>Hyogo;<br>Nobuyuki Asano, Suita-shi; Munetaka<br>Kawaguchi, Nishinomiya-shi, all of Japan |
|---|---|---|
| [21] | Appl. No. | 742,545 |
| [22] | Filed | July 5, 1968 |
| [45] | Patented | Nov. 16, 1971 |
| [73] | Assignee | Sumitomo Electric Industries Ltd.<br>Osaka, Japan |
| [32] | Priorities | July 5, 1967 |
| [33] | | Japan |
| [31] | | 42/43547;<br>July 5, 1967, Japan, No. 42/43548 |

[54] POLYESTER-AMIDE-IMIDE INSULATING VARNISH AND METHOD OF PREPARATION
14 Claims, No Drawings

[52] U.S. Cl. .................................................. 260/47 CB,
117/128.4, 117/132 B, 260/30.2, 260/32.6 N,
260/33.4 P, 260/37 N, 260/75 N, 260/77.5 R,
260/857 R

[51] Int. Cl. ..................................................... C08g 20/30,
C08g 20/32

[50] Field of Search............................................ 260/47 CZ,
47 CP, 78 TF, 77.5 R, 75 N, 75, 857

[56] References Cited
UNITED STATES PATENTS

| 3,314,923 | 4/1967 | Muller et al. ................ | 260/78 |
| 3,382,203 | 5/1968 | Rating et al.................. | 260/33.4 |
| 3,426,098 | 2/1969 | Meyer et al................... | 260/841 |
| 3,459,829 | 8/1969 | Schmidt et al. .............. | 260/850 |

*Primary Examiner*—William H. Short
*Assistant Examiner*—L. L. Lee
*Attorney*—Sughrue, Rothwell, Mion, Zinn & Macpeak ABSTRACT: An insulating varnish comprising essentially a polyester-amide-imide obtained by condensating (1) a precondensation product prepared by reacting tricarboxylic acid anhydride and at least one isocyanate compound selected from the group consisting of a diisocyanate and polyisocyanate, solid precondensate having an amide linkage and an imide linkage in the molecular chain, and (2) at least one compound selected from the group consisting of terephthalic acid, isophthalic acid and lower dialkylesters thereof, di-ol and poly-ol, or (2) lower polymerization polyesters thereof.

POLYESTER-AMIDE-IMIDE INSULATING VARNISH AND METHOD OF PREPARATION

BACKGROUND OF THE INVENTION

1. Field of the Invention

The present invention relates to an insulating varnish containing a polyester-amide-imide polymer having an excellent heat resistances and an excellent winderbility as its characteristics.

2. Background of the invention

Heretofore, a terephthalic polyester has been used as a Class B (130° C. Class) of heat resistant material for an insulting varnish. However, in recent years, because high-speed winding machines are widely employed in the manufacture of instruments, such insulating film is often damaged mechanically in the winding process, its insulating coating tens to be degraded. Further, increased efficiency of such instruments is required, higher reliability therefore is requested, and an insulating film excellent in heat resistance and processing degradation resistance is desired.

As a heat-resistant insulating varnish, a polyimide material has been developed and has been put to practical use. However, the polyimide is too poor in mechanical strength of the coating to bear the operation of high-speed winding machines, and is poor in alkaline resistance and moisture proofing, and further is bad in storage stability of varnish.

The present invention intends to provide economically an insulating varnish not having such defects and having a heat resistance above Class F (155° C.) and which has better heat resistance and processing degradation-resistance than the prior insulating varnish containing polyester.

SUMMARY OF THE INVENTION

The present invention relates to an insulating varnish comprising essentially a synthetic resin having amide linkage, imide linkage, and ester linkage in the main chain of a high molecule. That is, the present invention relates to an insulating varnish containing a polyester-amide-imide obtained by the condensation reaction of three polyester components comprising:

1. A precondensation product having amide linkage and imide linkage in a molecular chain obtained by reacting a tricarboxylic acid anhydride with an isocyanate compound selected from the group consisting of diisocyanate and polyisocyanate,
2. A compound selected from the group consisting of terephthalic acid isophthalic acid, and a lower dialkyl ester (an alkyl group having 1 to 4 carbon atoms) thereof, or a lower polymeric polyester thereof, and
3. a dihydric alcohol or polyhydric alcohol.

As the tricarboxylic acid employed in the present invention materials shown by the following formula may be used:

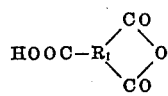

wherein $R_1$ represents

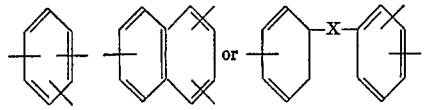

wherein X is —O—, —CH$_2$—, —S—, —SO$_2$—, or

The compounds represented by such formula include, for example, trimellitic anhydride hemimellitic anhydride, 1, 2, 5-naphthalene tricarboxylic acid anhydride, 3, 3', 4-diphenyl ether tricarboxylic acid anhydride, etc.

A suitable diisocyanate compound is shown by the formula OCN—R$_2$—NCO, wherein R$_2$ represents –(CH$_2$)$_p$–, wherein $l$ is an integer of 4 to 8,

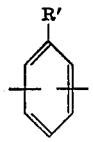

wherein R' is lower alkyl group such as —CH$_3$, —C$_2$H$_5$, etc.,

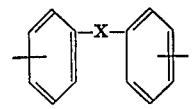

wherein X is the same as above, or

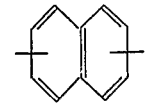

A suitable polyisocyanate compound is shown by the formula, R$_3$(NCO)$_n$ wherein R$_3$ represents

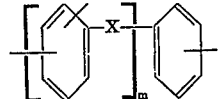

, wherein X is the same as above, and m is an integer of 2, 3, and 4, and n is an integer of 3 or more, and the mixtures thereof are usually used.

The compounds represented by such example, ethylene for example, hexamethylene diisocyanate, p-phenylene diisocyanate, m-phenylene diisocyanate, 1, 5-naphthalene diisocyanate, 2, 4-tolylene diisocyanate, 2, 6-tolylene diisocyanate, 4, 4'-diphenylmethane diisocyanate, 4, 4'-diphenyl ether diisocyanate, and polyphenylene polymethylene polyisocyanate, etc.

A suitable di-ol includes, for example thylene glycol, diethylene glycol, propylene glycol, 1, 3-propane-diol, 1, 4-butane-diol, neopentyl glycol, hydrogenated bisphenol A, and the like.

A suitable poly-ol includes, for example, glycerin, trimethylol-propane, trimethylol ethane, pentaerithritol, dipentaerithritol, tris-β-hydroxyethyl) isocyanurate, tris-β-hydroxy propyl) isocyanurate, and the like.

In the present invention two or more kinds of compounds in the same group may be mixed to use as the raw material for the compound.

The amounts of amide linkages and imide linkages in the polyesteramide-imide of the present invention can be optionally selected depending on the object of using the product, although the amounts are generally from 1 percent to 80 percent based on the total numbers of ester linkages, amide linkages, and imide linkages. The amounts can be more than 80 percent but such amounts do not much improve the characteristics, such as heat shock, and also make the product expensive. In the case of below 1 percent the characteristics of the polyester-amide-imide are lost. Generally the most preferably range is from 5 to 50 percent.

The precondensation product in the present invention is produced by reacting a tricarboxylic acid anhydride having at least two carbon atoms with the above diisocyanate or polyisocyanate in molten state. In certain cases the above reaction does not always proceed satisfactorily since the reaction temperature becomes too uniform because a colored porous solid is produced as soon as the reaction starts. In such cases an organic compound, such as, for example, solvent naphtha, xylene, etc., which does not dissolve or swell and is inert to the reaction, is added to the precondensation product and the reaction is proceeded, or the organic compound may be added at the initial period and reacted in an inert medium. In case of using the above process, the organic compound is employed in a liquid or gaseous state. The organic compound can make the temperature of whole solid, that is the temperature of the reaction system, uniform to complete the reaction, since the organic compound fills in void spaces of the porous solid. The amount of the liquid or gaseous organic compound to be employed may be sufficient so that the reactants are covered with the organic compound. In the latter process the liquid may be employed.

The ratio of tricarboxylic acid anhydride to isocyanate compound to be used may vary depending on the desired amount of amide linkage and imide linkage in polyesteramideimide although it is generally 0.05–1 equivalents of isocyanate compound per one equivalent of tricarboxylic acid anhydride, preferably 0.3–0.8 equivalents of isocyanate compounds per one equivalent of tricarboxylic acid anhydride. The reaction temperature is generally from the room temperature to 250° C. Below the room temperature, the generative of $CO_2$ is slow, that is the reaction proceeds very slowly while above 250° C. an undesirable side reaction occurs. Preferably, the reaction is proceeded at 80° to 200° C. until the reaction system is solidified, and, thereafter, is completed in the above organic compound at 120° to 200° C. The reaction time is approximately 2 to 10 hours.

The reaction of tricarboxylic acid anhydride and isocyanate compound can be carried out in a basic solvent such as dimethylformamide, dimethylacetamide, N-methyl-2-pyrrolidone, etc. The reaction is conducted above 40° C., generally at 80° to 200° C. for 1–10 hours.

The precondensation product so obtained is almost insoluble in a solvent at the room temperature and does not melt up to 300° C., however, on heating, the precondensation product is easily soluble in dimethylformamide, dimethylacetamide, N-methyl-2-pyrrolidone, m-cresol, o-cresol, p-cresol, etc. Then, on the condensation reaction of the above pre-condensation product and polyester component, the present inventors have discovered two excellent processes. According to one of the processes, the above precondensate and polyester components are reacted in a solvent, that is, the precondensate and polyester components are heated to react in the presence of a catalyst in a solvent, such as m-cresol, m-cresilic acid, N-methyl-2-pyrrolidone, etc. which can dissolve the precondensation product and the produced polymer in the room temperature or reaction temperature.

The amount of solvent in which the solid content is 20 to 60 percent, by weight is suitable. The reaction temperature is generally from 140° C. to the boiling point of solvent, preferably from 180° to 220° C. The reaction period is 3 to 10 hours, methanol and water produced in the reaction are preferably distilled out, and for this purpose the reaction apparatus is provided with a cooler which has a distilling tube at the top to distill out these by products.

For the reaction, an ester exchanging catalyst, used generally for producing a polyester, such as, for example, lead acetate, zinc acetate, zinc oxide, lead oxide, cobalt naphthenate, etc., is employed. And for esterifying the precondensation product, a catalyst used generally for esterifying an acid, such as, for example, p-toluene sulfonic acid, sulfuric acid, hydrochloric acid, etc., is employed.

Another process is that the above polyester components are reacted at molten state in the presence of the ester exchanging catalyst according to the conventional method, and during the period after the reaction system comes to the molten state, and before the polyester is gelated, the above precondensation product and the esterifying catalyst are added thereto and reacted. Generally, the precondensation product is added when the temperature of the reaction system consisting of lower polymers of polyester rose to 140° to 220° C., preferably 180° to 200° C. If the precondensation product is added after the temperature of the reaction system rose of above 220° C, the polyester is gelated before the precondensation product does not react sufficiently.

The reaction temperature can be maintained constant or may be raised slowly. Generally, the reaction is carried out at 180° C. for 5 to 6 hours, and thereafter at 220° C. for about 3 hours, or after the whole become to uniform, at 250° C. for 30 minutes to 2 hours. The kinds and amounts of catalyst may be the same as in the first method.

In this process, the precondensation product containing amide linkage and imide linkage is added when the temperature reaches to about 180° C. in the way of the condensation reaction of the above terephthalic polyester at molten state, since, if added and reacted from the initial period of the reaction with the above carboxylic acids, di-ol or poly-ol, the reaction system becomes too uniform and does not easily react, and sometimes solidifies before the polymer of the present invention is formed, because the precondensate is high in melting point and difficult to dissolve in conventional solvents. However, when the precondensate is added to the resinous composition produced by reacting carboxylic acids, di-ol and poly-ol in the molten state, the resinous composition dissolves to form a uniform system and the reaction proceeds to give the polymer of the present invention.

Tracing the reaction of producing the precondensate of the present invention in the case of trimellitic anhydride and diisocyanate in the equivalent ratio of 1:1, a carboxyl group, the presence of an acid anhydride, amide linkage and imide linkage and the absence of an isocyanate group are recognized. Then, the precondensation product so obtained is condensation reacted with polyester components. That is, at least one compound selected from terephthalic acid, isophthalic acid and lower alkyl ester thereof and di-ol, or poly-ol, or the lower molecular weight polymers.

The arrangement of polyester components and precondensation product in the produced polymer is considered to vary depending upon whether the reaction of polyester components and precondensation product is carried out in the solution or in the molten state. However, the polymers obtained in the both cases are not different in characteristics when used for an insulating varnish.

Polyester-amide-imide obtained by the process of the present invention is dissolved in a suitable solvent, such as dimethylformamide, dimethylacetamide, N-methyl-2-pyrrolidone, m-cresol, etc., and is used in mixture with the commonly used additives necessary to an insulating varnish, such as zinc octoate, lead octoate, tin octoate or cobalt naphthenate, as a hardener, or tetrabutyltitanium chelate tetraisopropyltitanium chlate, as a modifier, or isocyanate generator (trimer of 2, 4-totlylene diisocyanate) as a crosslinking agent. When polyester-amide-imide is produced in a solvent, the polymer solution obtained can be suitably controlled in its concentration to be used for an insulating varnish.

The insulating varnish of the present invention can be coated or baked on wires, iron plates, etc. to use.

The insulating varnish of the present invention is superior to the conventional insulating varnish, particularly that comprising essentially polyester in abrasion resistance, cut-through temperature and heat shock.

The present invention is more particularly illustrated with the following examples.

EXAMPLE 1

336.21 g. of trimellitic anhydride and 218.98 g. of 4, 4'-diphenylmethane diisocyanate were placed in a 2-ι four-necked flask provided with a stirrer, a thermometer, and an inlet tube introducing nitrogen gas. When heating at 80° C. in an oil bath and introducing nitrogen gas, 4, 4'-diphenylmethanediisocyanate was molten. On further heating, anhydride was dissolved. On approaching 140° C. the compounds reacted vigorously evolving carbon dioxide gas. After about 20 minutes, the evolution of carbon dioxide stopped and the reaction product was solidified. Then the introduction of nitrogen gas was discontinued, and 50 cc. of solvent naphtha (b.p. 170°–190° C.) was added in the flask and heated under reflux for 1 hours to complete the reaction of polyisocyanate compound and trimellitic anhydride. Then the nitrogen introducing tube was removed, and the cooler was replaced with an air-cooling distillation tower. 48.55 g. of dimethyl terephthalate, 61.21 g. of ethylene glycol, 86.16 g. of tris($\beta$-hydroxyethyl) isocyanurate, 0.2 g. of cadmium acetate, 0.2 g. of p-toluene sulfonic acid, and 940 g. of m-cresol were added in the reaction vessel and on heating to the boiling point of m-cresol, solvent naphtha was first distilled out, and water, methyl alcohol, m-cresol, etc. followed. On heating at the boiling point of m-cresol for 5 hours to continue the distillation, the reaction completed to give a viscous solution of polymer. Then m-cresol was added to adjust the nonvolatile content of the polymer solution to 40±2 percent, and, thereafter, 3.0 g. of zinc octoate (zinc content 8 percent) and 4 g. of tetrabutyltitanium chelate were added to 100 g. of the above polymer solution and mixed uniformly to give an insulating varnish. The viscosity of the insulating varnish was 76,000 c.p.s. (30° C.).

The insulating varnish thus obtained was coated and baked on a copper wire of 1.0 mm. diameter to give a coating of 0.04 mm. thickness thereon. The efficiency of the insulating wire thus obtained is shown in table 1.

EXAMPLE 2

In the same manner as in example 1, 172,91 g. of trimellitic anhydride, 112.62 g. of 4, 41-diphenylmethane diisocyanate, 50 cc. of solvent naphtha (b.p. 170° to 190° C.), 87.39 g. of dimethylterephthalate, 48.41 g. of ethylene glycol, 56.95 g. of tris-($\beta$-hydroxyethyl) isocyanurate, 0.2 g. of cadmium acetate, 0.2 g. of p-toluene sulfonic acid, and 60.0 g. of m-cresol were reacted in a 1 ι four-necked flask to give a polymer solution.

After adjusting the nonvolatile content of the polymer solution to 40± 2 percent by weight, as in example 1, 39 g. of zinc octoate, 4.5 g. of tetrabutyltitanium chelate and 2 g. of isocyanate generator (trimer of 2, 4-tolylene diisocyanate) were added to 100 g. of the polymer solution and mixed uniformly to give an insulating varnish. The insulating varnish was 10,800 cps (30° C.) in viscosity, and contained no insoluble content, such as gelated matter.

When so reacting in a solution, the reaction can be easily controlled and even the compound, such as the reaction product of trimellitic anhydride and 4, 4'-diphenylmethane diisocyanate, which is not molten even above 300° C., can be reacted uniformly.

Thus, the insulating varnish obtained was coated and baked on 1.0 mm. copper wire as in example to give an insulating wire. The efficiency of the insulating wire is shown in table 1.

EXAMPLE 3

In the same manner as in example 1, 144.09 g. of trimellitic anhydride, 125.13 g. of 4, 4'-diphenylmethane diisocyanate, 40 cc. of solvent naphtha (b.p. 175° to 185° C.), 76.29 g. of dimethylterephthalate, 23.94 g. of ethyleneglycol, 69.94 g. of tris($\beta$-hydroxyethyl) isocyanurate, 0.3 g. of cadmium acetate, 0.1 g. of p-toluene sulfonic acid, 540 g. of m-cresolic acid were reacted in a 2l four-necked flask to give a polymer solution. To the polymer solution zinc octoate, tetrabutyltitanium chelate, and regenerated trimer of 2, 4-tolylene diisocyanate were added to make an insulating varnish.

The efficiency of the insulating wire obtained by coating and baking the insulating varnish on a 1.0 mm. copper wire is shown in table 1.

EXAMPLE 4

In the same manner as in example 1, 176.11 g. of trimellitic anhydride, 114.70 g. of 4, 4'-diphenylmethane diisocyanate, 56.64 g. of solvent naphtha (b.p. 175° to 185° C.) and dimethylterephthalate, 40.35 g. of ethylene glycol, 16.37 g. of glycerin, 0.1 g. of cadmium acetate, and 0.2 g. of p-toluene sulfonic acid were reacted in a 2 four necked flask to give a polymer solution. And as in example 1 zinc octoate and tetrabutyltitanium chelate were added thereto to form an insulating varnish. The insulating varnish was coated on a 1.0 mm. copper wire to give an insulating wire, the efficiency thereof is shown in table 1.

EXAMPLE 5

In the same manner as in example 1, 102.47 g. of trimellitic anhydride, polyphenylene polyisocyanate (isocyanate equivalent 183.5), 40 cc. of solvent naphtha (b. p. 190° to 200° C.), 239.50 g. of dimethylterephthalate, 68.28 g. of ethylene glycol, 45.03 g. glycerin, 0.4 g. of zinc acetate, 0.2 g. of p-toluene sulfonic acid, and 0.20 g. of m-cresol were reacted in a 2 l four-necked flask to give a polymer solution. As in example 2, 3.0 g. of zinc octoate, 6 g. of tetrabutyltrianium chelate, and 4 g. of regenerated trimer of 2, 4-tolylene diisocyanate were added thereto and mixed uniformly to give an insulating varnish.

The insulating varnish is 5,300 c.p.s. (30° C.) in viscosity, and can be baked and harden at 200° C. for 3 hours. The coating of the insulating varnish baked on an iron plate of 0.3 mm. thickness was brown colored, smooth, and glossy, and breakdown voltage was 18.1 Kv./0.1 mm.

TABLE 1

|  | Wire by— | | | | Conventional polyester wire |
| --- | --- | --- | --- | --- | --- |
|  | Ex. 1 | Ex. 2 | Ex. 3 | Ex. 4 | |
| Baking temp., ° C | 430 | 430 | 430 | 430 | 430 |
| Baking speed, m./min | 8 | 8 | 8 | 8 | 8 |
| Diameter of bare wire (mm.) | 1,000 | 0.998 | 0.998 | 0.999 | 0.998 |
| Film thickness (mm.) | 0.040 | 0.040 | 0.041 | 0.039 | 0.041 |
| Pinhole (wound own diameter) | 0/50 | 0/50 | 1/50 | 0/50 | 0/50 |
| Abrasion resistance load 700 g., repeated scrape (average) | 98.5 | 87.3 | 84.5 | 83.2 | 43.6 |
| Cut through temp. (load 5 kg.) 1° C. up/2 min, ° C | 320 | 317 | 326 | 308 | 286 |
| Heat shock, 200° C. 2 hours | (¹) | (¹) | (²) | (¹) | (³) |
| Breakdown voltage, (kv.): | | | | | |
| (a) Ordinary state | 13.1 | 13.2 | 12.5 | 12.6 | 12.9 |
| (b) After 24 hours aging at 200° C | 13.4 | 13.2 | 13.8 | 13.9 | 12.9 |

¹ 1d, good.
² 2d, good.
³ 4d, good (180° C. 2 hours).

As described in the examples, according to the present invention, a high melting product containing amide linkage and imide linkage in the molecular chain obtained by reacting tricarboxylic acid anhydride and polyisocyanate can be reacted to give a polymer solution in the uniform state and without gelating. And also a coating obtained from the insulation varnish prepared according to the present invention is excellent in heat resistance and has sufficient mechanical strength under the operation by a high speed winding machines.

EXAMPLE 6

96.06 g. of trimellitic anhydride, 62.57 g. of 4, 41-diphenyl methane diisocyanate were placed in a 1 -l four-necked flask provided with a stirrer, a thermometer, a nitrogen gas introducing tube, and a cooler which is attached a calcium chloride drying tube. The reaction vessel was gradually heated in an oil bath, at the bath temperature of 80° C., 4, 4'-diphenylmethane diisocyanate melted. At this time the content was slowly stirred. When the bath temperature was raised to 130° C., the reaction of trimellitic anhydride, and 4, 4'-diphenyl methane diisocyanate was conformed to commence by evolution of carbon dioxide gas. By additional heating continuously the reaction system became to clear and uniform and increased its viscosity to be solidified. When solidified, the stirring was stopped, and 300 cc. of solvent naphtha boiling in the range of 175° to 185° C. was added to the reaction system and heated continuously for 3 hours to obtain a yellow powder which did not melt up to 300° C. and was conformed to the existence of amide linkage and imide linkage by the infrared spectrum. Then, 338.6 g. of dimethylterephthalate, 122.5 g. of ethylene glycol, 67.3 g. of glycerin, and 340 cc. of xylene were placed in a 2 l four-necked flask provided with a stirrer, a thermometer, and a distillation tube, and then 0.34 g. of cadmium acetate was added thereto as an ester exchanging catalyst.

The reaction vessel was heated externally, when the temperature of the reaction system reached to 100° C., dimethylterephthalate dissolved, and so slow stirring was commenced. After further heating, xylene started to distill out at 140° C. The reaction temperature was controlled to rise to 140° C. for 4 hours, while distilling out xylene, when the temperature of reaction system reached to 180° C., most of xylene was distilled out to remain a viscous resinous product to which 27.24 g. of the above precondensation product and then 0.34 g. of p-toluene sulfonic acid were added and the reaction was continued. The precondensation product which was first at the dispersed state dissolved into the resinous material. The reaction temperature was raised to 200° C. for about 1.5 hours and 1.5 hours and further to 250° c. for 1 hour. And while maintaining at 250° C. the reaction system was stirred continuously for about 2 hours, and thereafter the reaction system was maintained at the reduced pressure of 3 to 5 mm. Hg for about 3 minutes to remove water, methanol, xylene, etc. After returning the reaction system to the ordinary pressure heating was stopped and m-cresilic acid was added to complete the reaction. The product was dissolved and the nonvolatile materials thereof were adjusted to 40 percent by weight. Next, 2.7 g. of zinc octoate (zine content 8 percent, by weight) and 4 g. of tetrabutyltitanium chelate were added to 100 g. of the polymer solution and were stirred homogeneously to form an insulating varnish.

The insulating varnish thus obtained was coated and baked on a conductor by the conventional method to obtain an insulating wire. Its efficiency is shown in table 2.

As shown in table 2, the present insulating wire is extremely superior to the conventional polyester wire in the abrasion resistance, and has the characteristic sufficiently bearing to any severe processing conditions, and also, has an excellent heat shock. Therefore, the insulating varnish of the present invention can be said to have excellent thermal and mechanical characteristics.

EXAMPLE 7

As in example 6, 115.3 g. of trimellitic anhydride, 69.7 g. of a mixture of 2, 4-tolylene diisocyanate and 2, 6-tolyene diisocyanate in the ratio of 8:2 and 300 cc. of solvent naphtha (b.p. 175° to 185° C.) were reacted to obtain a yellowish-brown resinous powder which did not melt up to 300° C. and was confirmed to contain amide linkage and imide linkage. 458 g. of dimethylterephthalate, 113.7 g. of ethyleneglycol, 74.9 g. of glycerin, 0.4 g. of cadmium acetate, 103.9 g. of the above precondensate, 0.3 g. of p-toluene sulfonic acid, and 300 cc. of xylene were reacted in the same manner as in example 6 and the resulting product was dissolved in m-cresilic acid to obtain a viscous polymer solution. As in example 6, zinc octotate and tetrabutyl titanate chelate were added to the polymer solution to give an insulating varnish.

The characteristics of the insulating wire obtained by coating and baking the insulating varnish thereon are shown in table 2.

EXAMPLE 8

As in example 6, 438.7 g. of dimethylterephthalate, 138.8 g of ethylene glycol, 76.3 g. of glycerine, 154.4 g. of the precondensation product prepared in example 6, 0.38 g. of cadmium acetate, 0.3 g. of p-toluene sulfonic acid, and 350 cc. of xylene were reacted, and the resulting product was dissolved in m-cresol to obtain a viscous polymer solution to which zinc octoate and tetrabuyltitanium chelate was added to give an insulating varnish. The efficiency of the insulating wire obtained by coating and baking the insulating varnish thereon in the conventional technique is shown in table 2. As seen from table 2 the insulating wire so obtained is excellent in heat shock which is the most defect in the conventional polyester insulating wire, and also is excellent not only in abrasion resistance but heat resistance and processing property.

EXAMPLE 9

In the same manner as in example 6, 115.3 g. of trimellitic anhydride, 100.1 g. of 4, 4'-diphenyl methane diisocyanate and 300 cc. of solvent naphtha (b.p. 175° to 185° C.) were reacted to obtain a yellow resinous powder which did not melt up to 300° C. and was confirmed the presence of amide linkage and imide linkage by the infrared absorption spectrum.

As in example 6, 455.1 g. of dimethylterephthalate, 133.9 g. of ethylene glycol, 73.6 g. of glycerin, 98.2 g of the above precondensation product, 0.4 g. of cadmium acetate, 0.3 g. of p-toluene sulfonic acid, and 350 cc. of xylene were reacted, and the resulting product was dissolved in m-cresol and added with the same additives as in example 6 to obtain an insulating varnish. The efficiency of the insulating wire obtained by coating and baking the varnish is shown in table 2.

EXAMPLE 10

In the same manner as in example 6, 106.7 g. of trimellitic anhydride, 74.2 g. of polymethylene polyphenylene polyisocyanate in which isocyanate equivalent be 133.5, and 300 cc. of solvent naphtha (b.p. 175° to 185° C.) were reacted to obtain a brown resinous powder which did not melt up to 300° C. and was confirmed the presences of amide linkage and imide linkage by infrared spectrum.

Then, as in 4-diphenylether diisocyanate for 4, 4'-diphenylmethane diisocyanate g. of dimethyl terephthalate, 131.5 g. of ethylene glycol, 72.3 g. of glycerin, 180.8 g. of the above precondensation product, 0.38 g. of cadmium acetate, 0.3 g. of p-toluene sulfonic acid and 300 cc. of xylene were reacted and the resulting product was dissolved in m-cresol to obtain a polymer solution to which the additives were added to form an insulating varnish. 4 g. of regenerated trimer of tolylene diisocyanate was added to 100 g. of the insulating varnish. The varnish has viscosity of 12,700 c.p.s. specific gravity of 1.20 and its baked coating cut through temperature was 320° C., and its breakdown voltage was 12.6 Kv./0.1 mm. and when bending on a 3 mm. mandrel, no cracks were found.

EXAMPLE 11

When substituted 4, 4-diphenylmethane diisocyanate in example 9, the similar result was obtained.

TABLE 2

|  | Wire by— | | | | Conven- tional polyester wire |
|---|---|---|---|---|---|
|  | Ex. 6 | Ex. 7 | Ex. 8 | Ex. 9 |  |
| Baking temp., ° C | 450 | 450 | 450 | 450 | 450 |
| Baking speed, m./min | 10 | 10 | 10 | 10 | 10 |
| Diameter of bare wire (mm.) | 1,000 | 1,000 | 1,001 | 1,000 | 1,003 |
| Film thickness (mm.) | 0.040 | 0.040 | 0.039 | 0.041 | 0.040 |
| Pinhole (wound own diameter) | 0/50 | 1/50 | 0/50 | 0/50 | 1/50 |
| Abrasion resistance, load 700 g., repeated scrape (average) | 83.5 | 89.1 | 72.4 | 78.2 | 46.1 |
| Cut through temp. (load 5 kg.) 1° C., up/2 min | 310 | 305 | 238 | 295 | 283 |
| Heat shock, 200° C., 2 hours | (¹) | (²) | (¹) | (¹) | (³) |
| Breakdown voltage (kv.): | | | | | |
| (a) Ordinary state | 12.8 | 12.4 | 13.2 | 12.4 | 13.2 |
| (b) After 24 hours aging at 200° C | 13.4 | 14.3 | 13.2 | 13.9 | 13.2 |

¹ 1d, good.
² 2d, good.
³ 4d, good (130 C-2h).

What is claimed is:

1. An insulating varnish consisting essentially of a polyester amide-imide condensation product obtained by condensing (1) a precondensation product prepared by reacting at a temperature of from 20° to 250° C. at least one tricarboxylic acid anhydride selected from the group consisting of compounds of the formula:

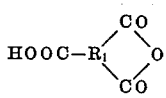

wherein $R_1$ represents a member selected from the group consisting of (A)          (B)

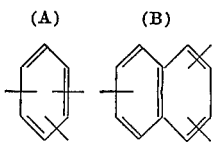

and wherein X is selected from the group consisting of $-O-$, $-CH_2-$, $-S-$, $-SO_2-$ and

and at least one organic polyisocyanate compound selected from the group consisting of compounds of the formula OCN—$R_2$—NCO, wherein $R_2$ is selected from the group consisting of $-(CH_2)_p$, wherein $l$ is an integer of from 4 to 8

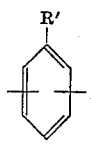

wherein R' is a lower alkyl group having from 1 to 4 carbon atoms;

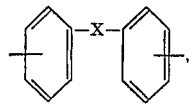

wherein X is as defined above;

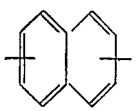

and compounds of the formula $R_3(NCO)_n$, wherein $R_3$ is

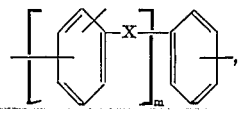

wherein X is as defined above, wherein $m$ is an integer of from 2 to 4 and $n$ is an integer of 3 or more; and mixtures thereof, the ratio of the anhydride to the polyisocyanate in the precondensate ranges from 1:1 to 1:0.05, (2) at least one compound selected from the group consisting of terephthalic acid; isophthalic acid; lower dialkylesters of terephthalic acid, said alkyl groups having from 1 to 4 carbon atoms; lower dialkyl esters of isophthalic acid, said alkyl groups having from 1 to 4 carbon atoms; and the lower polymerization polyesters of a member selected from the group consisting of terephthalic acid with at least a nonaromatic polyol having from 2 to 15 carbon atoms and isophthalic acid with at least a nonaromatic polyol having from 2 to 15 carbon atoms, and (3) at least one nonaromatic polyol having from 2 to 15 carbon atoms and from 2 to 6 hydroxy groups; the proportions of (2) and (3) above to (1) being such that the condensation product contains from 1 to 99 percent amide and imide linkages.

2. An insulating varnish claimed in claim 1, in which said tricarboxylic acid anhydride is trimellitic anhydride.

3. An insulating varnish claimed in claim 1, in which said diisocyanate is selected from the group consisting of 4, 4'-diphenylmethane diisocyanate, 4, 4'-diphenylether diisocyanate, 2, 4-tolylene diisocyanate, 2, 6'-tolylene diisocyanate, and polyphenylene methylene polyisocyanate.

4. An insulating varnish claimed in claim 1, in which the polyol is ethylene glycol.

5. An insulating varnish as claimed in claim 1, in which the polyol is selected from the group consisting of glycerin and tris-($\beta$-hydroxyethyl) isocyanurate.

6. An insulating varnish claimed in claim 1, in which the condensation product contains from 1 to 80 percent amide linkages and imide linkages.

7. An insulating varnish as claimed in claim 1, in which said polyester-amide-imide condensation product is one obtained by the condensation polymerization reaction of (1) the precondensation product of claim 1 (2) least one compound selected from the group consisting of terephthalic acid, isophthalic acid and the lower dialkylesters thereof, and (3) a polyol of claim 1 in and inert and unreactive solvent.

8. An insulating varnish as claimed in claim 1, in which the polyester-amide-imide condensation product is one obtained by reacting in the molten state at least one compound of (2), said compound being selected from the group consisting of terephthalic acid, isophthalic acid and lower dialkylesters thereof, and a polyol of (3) and adding the precondensation product of (1) thereto after the reaction system becomes molten and before the product is gelated.

9. In an insulating wire comprising a coating on a wire substrate, said coating being baked on said substrate, the improvement which comprises the coating being the insulating varnish condensation product of claim 1.

10. A process for obtaining a condensation product of claim 1 comprising heating and reacting the tricarboxylic acid anhydride of claim 1 and at least one polyisocyanate compound of claim 1, and, when the reaction system is solidified, subsequently heating the mixture in an organic solvent which does not dissolve and swell the reaction product and is inert to the reaction.

11. A process as claimed in claim 10, in which the organic solvent is liquid during the reaction.

12. A process as claimed in claim 10, in which the organic solvent is gaseous during the reaction.

13. A process for obtaining the condensation product of claim 1 mixed with a liquid organic solvent which does not dissolve and swell the reaction product and is inert to the reaction.

14. An insulating varnish consisting essentially of a polyester-amide-imide condensation product obtained by condensing (1) a precondensation product prepared by reacting at a temperature of from 20° to 250° C. trimellitic anhydride, and 4, 4'-diphenyl-methylene diisocyanate, the ratio of the anhydride to the diisocyanate in the precondensate ranging from 1:1 to 1:0.05 (2) dimethyl terephthalate; and (2) a polyol selected from the group consisting of ethylene glycol and tris-($\beta$-hydroxethyl)isocyanurate; the proportions of (2) and (3) above to (1) being such that the condensation product contains from 1 to 99 percent amide and imide linkages.

* * * * *